United States Patent [19]
Dee et al.

[11] Patent Number: 5,364,929
[45] Date of Patent: Nov. 15, 1994

[54] DISSOLUTION OF TETRAFLUOROETHYLENE POLYMERS AT SUPERAUTOGENOUS PRESSURE

[75] Inventors: Gregory T. Dee, Wilmington; William H. Tuminello, Newark, both of Del.

[73] Assignee: E. I. Du Pont de Nemours and Company, Wilmington, Del.

[21] Appl. No.: 3,762

[22] Filed: Jan. 13, 1993

[51] Int. Cl.$^5$ .......................... C08K 5/20; C08F 6/00
[52] U.S. Cl. ........................... 528/491; 524/462; 524/463; 524/465; 524/466; 524/473
[58] Field of Search ............ 524/465, 467, 470, 473, 524/462, 466; 528/491, 502, 503

[56] References Cited

U.S. PATENT DOCUMENTS

| | | | |
|---|---|---|---|
| 4,266,036 | 5/1981 | Baczek et al. | 521/26 |
| 4,897,457 | 1/1990 | Nakamura et al. | 526/247 |
| 4,931,511 | 6/1990 | Kawachi et al. | 525/326.3 |
| 5,117,272 | 5/1992 | Nomura et al. | 357/52 |
| 5,237,049 | 8/1993 | Cavanaugh et al. | 528/491 |

OTHER PUBLICATIONS

P. Smith and K. Gardner, Macromol., vol. 18, 1222–1228 (1985).

*Primary Examiner*—Paul R. Michl
*Assistant Examiner*—Tae H. Yoon
*Attorney, Agent, or Firm*—Susan Borden Evans

[57] ABSTRACT

Disclosed herein is a process for dissolving high melting polymers containing tetrafluoroethylene units at pressures greater than autogenous pressure, using selected halogenated solvents that are often not solvents at autogenous pressure. Also disclosed are the solutions resulting from this process. The solutions are useful for preparing fibers and paper-like webs from these polymers.

21 Claims, No Drawings

DISSOLUTION OF TETRAFLUOROETHYLENE POLYMERS AT SUPERAUTOGENOUS PRESSURE

FIELD OF THE INVENTION

This invention involves a process for dissolving high melting point tetrafluoroethylene polymers, in selected halogenated compounds at superautogenous pressure. Also disclosed are the novel solutions (at superautogenous pressure) produced by this process.

TECHNICAL BACKGROUND

It is known that high melting point tetrafluoroethylene polymers such as polytetrafluoroethylene homopolymer (PTFE) dissolve in relatively high boiling point solvents, see for instance P. Smith and K. Gardner, Macromol., Vol. 18, 1222–1228 (1985). Lower boiling point compounds, such as the lower perfluorinated alkanes usually do not dissolve polymers such as PTFE under autogenous pressure. It is believed that to dissolve PTFE under autogenous pressure a compound with a critical temperature above about 340° C. is needed (see commonly assigned U.S. patent application Ser. No. 07/936,449, filed Aug. 28, 1992).

SUMMARY OF THE INVENTION

This invention provides a process for the dissolution of high melting point tetrafluoroethylene polymers, comprising, contacting a halogenated compound with a tetrafluoroethylene polymer, at a first temperature high enough to dissolve said polymer, at a first pressure of 0.1 MPa to about 275 MPa above the autogenous pressure of said compound at said first temperature, wherein said halogenated compound:

contains only carbon, fluorine and chlorine, or carbon, bromine, chlorine and fluorine, or carbon, fluorine and bromine, or carbon and fluorine, or carbon and chlorine, and may also contain one or more of hydrogen, ether oxygen or tertiary amino nitrogen;

the total number of hydrogen atoms is equal to or less than the total number of chlorine and fluorine atoms;

no hydrogen atoms are on a carbon atom alpha to a carbon atom bound to a chlorine or bromine atom; and is a saturated, aromatic or a combined saturated and aromatic compound; and provided that said polymer has a melting point of about 250° C. or more.

This invention also concerns a composition, comprising, a tetrafluoroethylene polymer with a melting point of 250° C. or more dissolved in a halogenated compound, wherein said halogenated compound:

contains carbon, fluorine and chlorine, or carbon, fluorine, chlorine and bromine, or carbon, fluorine and bromine, or carbon and fluorine, or carbon and chlorine, and may also contain one or more of hydrogen, ether oxygen or tertiary amino nitrogen;

the total number of hydrogen atoms is equal to or less than the total number of chlorine and fluorine atoms;

no hydrogen atoms are on a carbon atom alpha to a carbon atom bound to a chlorine or bromine atom; and is a saturated, aromatic or a combined saturated and aromatic compound;

and said halogenated compound has a critical temperature of less than 340° C.

DETAILS OF THE INVENTION

By a tetrafluoroethylene polymer herein is meant homo- and copolymers that contain "tetrafluoroethylene units", that is units derived from the free radical polymerization of tetrafluoroethylene (TFE), and are understood to have the formula —$CF_2$—$CF_2$—. Polymers containing TFE units, particularly the homopolymer, PTFE, and copolymers containing relatively high proportions of TFE, tend to have high melting and these high melting points, combined with the relative chemical inertness of these polymers, makes them difficult to dissolve (see Smith and Gardner, supra). In the TFE copolymers useful in this invention, it is preferred if the comonomer(s) are perfluorinated, and especially preferred if the comonomer is selected from the group consisting of hexafluoropropylene, perfluoro(methyl vinyl ether) and perfluoro(propyl vinyl ether). Also preferred is the homopolymer of TFE. These polymers and their syntheses are known to those skilled in the art, and many are items of commerce.

Polymers useful in the present invention have a melting point (of pure polymer in the absence of "solvent") of about 250° C. or higher, preferably about 265° C. or higher. Polymer melting points are measured by Differential Scanning Calorimetry, and the melting points herein are measured at a heating rate of 20° C./min, and the melting point is taken as the minimum (peak) of the melting point endotherm.

The halogenated compounds used herein act as a solvent at superautogenous pressure. By an aromatic compound herein is meant a compound which contains one or more aromatic rings. The rings may be joined by a covalent bond and/or fused together. Typical halogenated compounds are halogenated benzenes. By a saturated halogenated compound is meant any compound which does not contain a carbon-carbon double or triple bond. Thus such compounds include halogenated alkanes and cycloalkanes. By a combined saturated and aromatic halogenated compound is meant a compound which contains one or more saturated halogenated radicals such as alkyl, alkylene and cycloalkyl groups, and an aromatic radical such as phenyl. It is preferred if the compound is perfluorinated, perfluorinated and containing one or two hydrogen atoms, or perhalogenated. By halogen herein is meant fluorine, chlorine and bromine. Preferred compounds herein are perfluorinated alkanes, aromatics, and combined saturated and aromatic compounds, and perhalogenated alkanes, aromatics and combined saturated and aromatic compounds. Particularly preferred compounds are perfluoro-n-alkanes containing 2 to 20 carbon atoms, perfluorobenzene, perfluorodecahydronaphthalene, 1,1,2-trichloro-1,2,2-trifluoroethane, perfluoro (2-n-butyltetrahydrofuran), 1,1,1-trichlorotrifluoroethane, 1,1-difluorotetrachloroethane, 1,2-difluorotetrachloroethane, fluoropentachloroethane, hexachloroethane, carbon tetrachloride, perfluoro(methyldecahydronaphthalene), and perfluoro(dimethyldecahydronaphthalene). Especially preferred compounds are perfluoro-n-alkanes containing 6 to 12 carbon atoms, perfluorodecahydronaphthalene, 1,1,2-trichloro-1,2,2-trifluoroethane, and perfluoro(2-n-butyltetrahydrofuran).

It is preferred if the critical temperature of the halogenated compound is less than about 340° C., since such compounds are not normally solvents for PTFE under autogenous pressure. However, halogenated compounds with critical temperatures above 340° C. may also be used, even though these solvents will also dissolve PTFE under autogenous conditions. Critical temperatures of many halogenated compounds can be found in standard references, and may be measured by methods known to the art skilled.

The process of dissolving the TFE polymer is carried out and the solution maintained under superautogenous pressure, at 0.1 to 275 MPa above the autogenous pressure. By autogenous pressure herein is meant the total vapor pressure of all the components, which usually is the vapor pressure of the halogenated compound present. It is preferred if the process is carried out at, and the composition maintained at, a superautogenous pressure of 0.5 MPa to about 140 MPa, more preferably about 1.0 MPa to about 40 MPa. The superautogenous pressure may be applied by adding an inert gas such as nitrogen or argon, but these gases may have appreciable solubility in the halogenated compound and/or TFE polymer solution, so control of the superautogenous pressure may be difficult. It is preferred to control the system pressure by applying pressure to the (liquid) halogenated compound, as by a piston (see General Procedure).

The minimum temperature required to dissolve a particular polymer at a particular superautogenous pressure in a given halogenated compound can be determined by simple experimentation (see General Procedure). Generally speaking, lower melting polymers will require lower temperatures, while higher melting polymers, such as PTFE, will require higher temperatures.

The halogenated compound and polymer must be stable at the dissolution temperature. Exposure of the hot halogenated compound and/or polymer to active metals such as aluminum and iron (in some forms) may cause halogenated compound and/or polymer decomposition. Stirring or other forms of agitation will increase the rate of dissolution of the polymer. Other factors which influence the rate of dissolution and their effect are, higher interfacial surface area between the polymer and solvent gives faster rates, and higher polymer molecular weight and higher polymer concentrations give slower rates of dissolution. The time required for dissolution will vary with the particular polymer and halogenated compound chosen, as well as the dissolution conditions, but generally will be in the range of a few hours to a few weeks. Dissolution can be followed visually (see General Procedure).

It is preferred if the final polymer concentration in the halogenated compound is about 0.1 to about 25 percent by weight, if a pourable solution is desired. The higher the molecular weight of the polymer, the more difficult it is to make relatively concentrated solutions, due to viscosity limitations. Much higher concentrations could be obtained by extruder mixing. Foams could be obtained from such a system. Preferred ingredients noted herein are the same for the process of dissolving and for the solution itself. It should also be noted that the solution formed must be maintained under the conditions used to dissolve the polymer (of course the temperature may be raised and/or the superautogenous pressure varied in the range of polymer solubility) so that the polymer will not precipitate, nor the halogenated compound flash off.

The solutions herein are especially useful for making fibers and paper-like webs from TFE polymers. Such procedures are generally known in the art for other types of polymers, see for instance U.S. Pat. No. 4,054,625. This invention may also be used for more efficient extractions or recovery of fluoropolymers from coated articles by dissolution.

In the following Examples, the polymer used was described as PTFE-6 in W. H. Tuminello et al., Macromol., Vol. 21, 2606–2610 (1988) (which is hereby included by reference). This polymer is a homopolymer of TFE. The critical temperatures given are taken from the literature, R. C. Reid et al., The Properties of Liquids and Gases, 4th Ed., McGraw-Hill Book CID., New York, 1987, except as noted.

General Procedure

The apparatus used in the Examples is generally illustrated in J. R. DiAndreth et al., Ind. Eng. Chem. Res., Vol. 26, 339–340 (1987) with the exceptions noted below. These changes were made to accommodate higher temperatures, and since there was no need to change the volume of the cell, to merely control the pressure.

The apparatus consists of a steel block having two sapphire windows and two ports, placed inside an aluminum heating block. The cylindrical block is approximately 6.4 cm in diameter and 5.7 cm long. A 1.3 cm diameter by 2.3 cm long chamber is at the center of the apparatus and occupies a volume of about 3.0 mL. The sapphire windows at the ends of the chamber are sealed with custom-designed nickel seals. The cell was tested at 315° C. 31 MPa pressure with no evidence of leaks. The windows permit visibility of cloud point formation using a video camera and recorder. The windows are oriented in a horizontal fashion while the two ports are vertical. A thermocouple was located in the lower port while a stirring shaft was placed through the upper. The upper port also acted as a feedline for the solvent, allowing control of the pressure chamber and was driven by a magnetic coupling.

Polymer was loaded into the chamber which was evacuated overnight. The sample was then either heated to nearly 300° C. before solvent was added or the solvent was added cold with subsequent heating. Dissolution was obtained with the proper combination of pressure and temperature. Cloud points were measured as the pressure at which cloudiness started to appear in the transparent solution at a specific temperature. Measurements were made in series as the temperature both increased and decreased. There was no significant difference.

EXAMPLE 1

PTFE (0.26 weight %) solutions were made in perfluorodecahydronaphthalene, $C_{10}F_{18}$, at 285° C., 4.1 MPa. The solvent was obtained from PCR, Inc. Cloud point data was collected from 280° to 331° C . The experiment was repeated. The data for these two runs is given in Table I. An identical run was done at twice the polymer concentration, with identical results. At this level, polymer concentration did not seem to be a variable. It appeared that crystallization started to occur slightly below 280° C.

EXAMPLE 2

Solutions (0.25 weight percent) were obtained in perfluoro-n-hexane (PCR, Inc.) at 305° C., 22.3 MPa. Recrystallization appeared to occur at about 295° C. Cloud points were obtained at 312° and 316° C.

The cloud points are shown in Table I.

EXAMPLE 3

Solutions were obtained in 1,1,2-trichloro-1,2,2-trifluoroethane (0.17% weight polymer) at 305° C., 13.8 MPa. The solvent was obtained from VWR Scientific. Recrystallization appeared to start at about 288° C. Cloud points are shown in Table I.

EXAMPLE 4

"Fluorinert" FC-75 (Registered Trademark of and available from 3M Co., St. Paul, Minn.), which is a perfluorinated ether consisting mostly of perfluoro(2-n-butyltetrahydrofuran) was used as the solvent. Solution was obtained at 303° C., 18.7 MPa with 0.15 weight percent polymer. Recrystallization appeared to start near 296° C. Cloud points are shown in Table I.

TABLE I

| Example No. | | | | | | | | | |
|---|---|---|---|---|---|---|---|---|---|
| 1a | | 1 | | 2 | | 3 | | 4 | |
| Polymer Concentration | | | | | | | | | |
| (0.26%) | | (0.52%) | | (0.23%) | | (0.17%) | | (0.15%) | |
| Solvent Critical Temp (°C.) | | | | | | | | | |
| 293 | | 293 | | 176 | | 214 | | 228–233 | |
| T (°C.) | Cld Pt (MPa) | T (°C.) | Cld Pt (MPa) | T (°C.) | Cld Pt (MPa) | T (°C.) | Cld Pt (MPa) | T (°C.) | Cld Pt (MPa) |
| 290 | 2.66 | 290 | 2.76 | 316 | 18.6 | 305 | 12.9 | 305 | 11.5 |
| 300 | 3.16 | 301 | 3.35 | 312 | 19.1 | 308 | 13.3 | 308 | 11.7 |
| 310 | 3.74 | 311 | 3.86 | | | 312 | 13.7 | 310 | 11.8 |
| 320 | 4.24 | 321 | 4.34 | | | 320 | 13.9 | 316 | 11.9 |
| 330 | 4.70 | 330 | 4.75 | | | 315 | 13.7 | 319 | 12.0 |
| 320 | 4.19 | 321 | 4.32 | | | 312 | 13.7 | 296 | 11.4 |
| 310 | 3.75 | 310 | 3.83 | | | 306 | 13.3 | | |
| 300 | 3.22 | 300 | 3.24 | | | 300 | 12.8 | | |
| 290 | 2.65 | 290 | 2.77 | | | 292 | 12.7 | | |
| 284 | 2.34 | 280 | 2.15 | | | | | | |
| 290 | 2.74 | | | | | | | | |
| 300 | 3.31 | | | | | | | | |
| 310 | 3.88 | | | | | | | | |
| 322 | 4.42 | | | | | | | | |
| 331 | 4.83 | | | | | | | | |
| 328 | 4.79 | | | | | | | | |
| 322 | 4.41 | | | | | | | | |
| 299 | 3.30 | | | | | | | | |
| 290 | 2.79 | | | | | | | | |
| 281 | 2.20 | | | | | | | | |
| 283 | 2.36 | | | | | | | | |
| 291 | 2.80 | | | | | | | | |
| 300 | 3.37 | | | | | | | | |
| 310 | 3.89 | | | | | | | | |
| 321 | 4.41 | | | | | | | | |
| 331 | 4.81 | | | | | | | | | aFrom 3 separate runs

What is claimed is:

1. A process for the dissolution of high melting point tetrafluoroethylene polymers, comprising, contacting a halogenated compound with a tetrafluoroethylene polymer, at a first temperature high enough to dissolve said polymer, at a first pressure of 0.1MPa to about 275 MPa above an autogenous pressure of said compound at said first temperature, wherein said halogenated compound:
   contains only carbon, fluorine and chlorine, or carbon, fluorine, chlorine and bromine, or carbon, fluorine and bromine, or carbon and fluorine, or carbon and chlorine, and may also contain one or more of hydrogen, ether oxygen or tertiary amino nitrogen;
   the total number of hydrogen atoms is equal to or less than the total number of chlorine and fluorine atoms;
   no hydrogen atoms are on a carbon atom alpha to a carbon atom bound to a chlorine or bromine atom; and
   is a saturated, aromatic or a combined saturated and aromatic compound; and provided that said polymer has a melting point of about 250° C. or more.

2. The process as recited in claim 1 wherein said first pressure is about 0.5 MPa to about 140 MPa above said autogenous pressure of said compound at said first temperature.

3. The process as recited in claim 1 wherein said first pressure is about 1.0 MPa to about 40 MPa above said autogenous pressure of said compound at said first temperature.

4. The process as recited in claim 1 wherein said tetrafluoroethylene polymer is a homopolymer.

5. The process as recited in claim 1 wherein said tetrafluoroethylene polymer is a copolymer.

6. The process as recited in claim 5 wherein a comonomer is hexafluoropropylene, perfluoro(methyl vinyl ether) or perfluoro(propyl vinyl ether).

7. The process as recited in claim 1 wherein said melting point is 265° C. or higher.

8. The process as recited in claim 1 wherein said halogenated compound is perfluorinated, perfluorinated and containing one or two hydrogen atoms, or perhalogenated.

9. The process as recited in claim 4 wherein said halogenated compound is perfluorinated, perfluorinated and containing one or two hydrogen atoms, or perhalogenated.

10. The process as recited in claim 5 wherein said halogenated compound is perfluorinated, perfluorinated and containing one or two hydrogen atoms, or perhalogenated.

11. The process as recited in claim 1 wherein said halogenated compound is a perfluoro-n-alkane containing 2 to 20 carbon atoms, perfluorobenzene, perfluorodecahydronaphthalene, 1,1,2-trichloro-1,2,2-trifluoroethane, perfluoro (2-n-butyltetrahydrofuran), 1,1,1-trichlorotrifluoroethane, 1,1-difluorotetrachloroethane, 1,2-difluorotetrachloroethane, fluoropentachloroethane, hexachloroethane, carbon tetrachloride, perfluoro(methyldecahydronaphthalene), or perfluoro(dimethyldecahydronaphthalene).

12. The process as recited in claim 1 wherein said halogenated compound has a critical temperature of 340° C. or less.

13. The process as recited in claim 3 wherein said halogenated compound has a critical temperature of 340° C. or less.

14. The process as recited in claim 4 wherein said halogenated compound has a critical temperature of 340° C. or less.

15. The process as recited in claim 5 wherein said halogenated compound has a critical temperature of 340° C. or less.

16. A composition, comprising, a tetrafluoroethylene polymer with a melting point of 250° C. or more dissolved in a halogenated compound, wherein said halogenated compound:

contains carbon, fluorine and chlorine, or carbon, fluorine, bromine and chlorine, or carbon, fluorine and bromine, or carbon and fluorine, or carbon and chlorine, and may also contain one or more of hydrogen, ether oxygen or tertiary amino nitrogen;

the total number of hydrogen atoms is equal to or less than the total number of chlorine and fluorine atoms;

no hydrogen atoms are on a carbon atom alpha to a carbon atom bound to a chlorine or bromine atom; and is a saturated, aromatic or a combined saturated and aromatic compound;

said halogenated compound has a critical temperature of less than 340° C.;

and wherein the composition is maintained at a superautogenous pressure of 0.1 MPa to 275 MPa above autogenous pressure.

17. The composition as recited in claim 16 wherein said tetrafluoroethylene polymer is a homopolymer.

18. The composition as recited in claim 16 wherein said tetrafluoroethylene polymer is a copolymer.

19. The composition as recited in claim 18 wherein a comonomer is hexafluoropropylene, perfluoro(methyl vinyl ether) or perfluoro(propyl vinyl ether).

20. The composition as recited in claim 16 wherein said halogenated compound is perfluorinated, perfluorinated and containing one or two hydrogen atoms, or perhalogenated.

21. The composition as recited in claim 16 wherein said halogenated compound is a perfluoro-n-alkane containing 2 to 20 carbon atoms, perfluorobenzene, perfluorodecahydronaphthalene, 1,1,2-trichloro-1,2,2-trifluoroethane, perfluor(2-n-butyltetrahydrofuran), 1,1,1-trichlorotrifluoroethane, 1,1-difluorotetrachloroethane, 1,2-difluorotetrachloroethane, fluoropentachloroethane, hexachloroethane, carbon tetrachloride, perfluoro(methyldecahydronaphthalene), or perfluoro(dimethyldecahydronaphthalene).

* * * * *